ELECTRICAL COMPONENT MOUNTING ARRANGEMENT AND METHOD

Filed July 7, 1958

INVENTORS.
ROBERT E. KNEPSHIELD
BY JAMES CONTO
D. Gordon Angus
ATTORNEY.

United States Patent Office 2,908,850

Patented Oct. 13, 1959

2,908,850

ELECTRICAL COMPONENT MOUNTING ARRANGEMENT AND METHOD

Robert E. Knepshield, Manhattan Beach, and James Conto, Inglewood, Calif., assignors to International Rectifier Corporation, El Segundo, Calif., a corporation of California

Application July 7, 1958, Serial No. 746,694

8 Claims. (Cl. 317—234)

This invention relates to electrical components, and more particularly to arrangements for mounting electrical components within spring clip mountings, and has for its principal object to enable such a component to be mounted in the general manner of fuse clips.

Electrical components including diodes such as the well-known silicon and germanium P–N junction type, are commonly provided with terminal leads in the form of metallic pigtails by which they are fastened in their place to terminal posts on a panel or the like. This is commonly done by soldering the pigtails to their respective terminal posts or lugs; and it provides a permanent installation inasmuch as removal of the component from its place ordinarily requires melting of the solder.

It is sometimes desirable to install the components in place in a temporary manner, which permits ready installation and removal of the component, as for example, by the use of spring terminal clips such as fuse clips.

In accordance with the present invention, means is provided which adapt such components, especially diodes, to use with terminal clips. The invention is carried out by use of a tube of insulating material placed over a terminal lead or pigtail which is brought out from within the housing of the component. The lead extends through the tube and is crimped over the outer end of the tube after which a contact cap is snugly fitted over this outer end of the tube and the crimped pigtail in spaced relation to the base of the component so that the base and the cap are in proper spaced relationship to be used in a fuse clip type of holder.

The foregoing and other features of the invention will be better understood from the following detailed description and the accompanying drawing of which:

Figure 1:
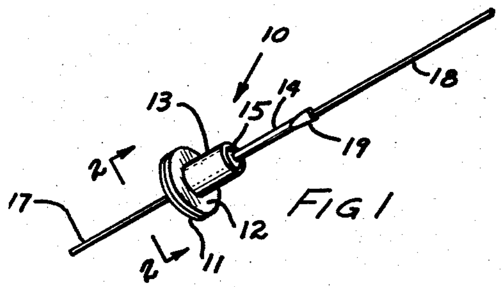
Fig. 1 is an isometric view of a known type of diode rectifier provided with pigtail terminal leads.
Figure 2:
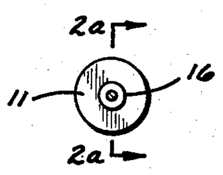
Fig. 2 is an end view of the diode taken at line 2—2 of Fig. 1.
Figure 3:
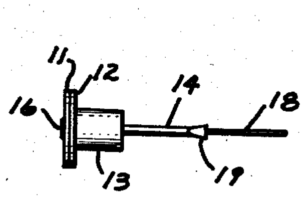
Figure 2A:
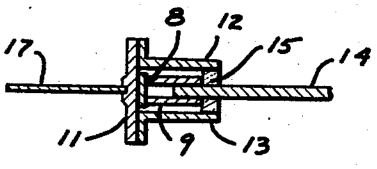
Figure 4:
Figure 4A:
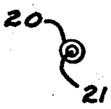
Figure 5B:
Figure 5:
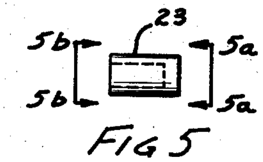
Figure 5A:
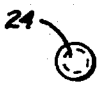
Figure 6:
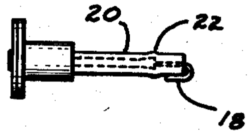
Figure 8:
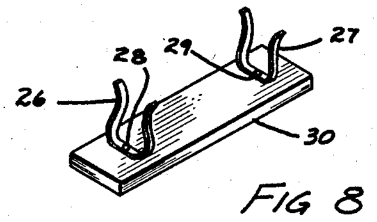
Figure 7:
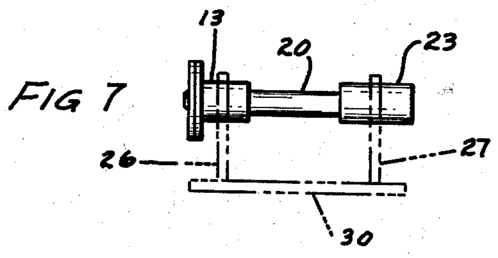

Fig. 2*a* is a cross-section view taken at line 2*a*—2*a* of Fig. 2;

Fig. 3 is a side view of the diode of Fig. 1 after one of its pigtail leads has been removed and the other has been shortened;

Fig. 4 is a side view of an insulating tubing used in the practice of the invention;

Fig. 4*a* is an end view of the tubing of Fig. 4;

Fig. 5 is a side view of a cap used in the assembly of the invention;

Fig. 5*a* is an end view of the cap of Fig. 5 taken at line 5*a*—5*a* of Fig. 5;

Fig. 5*b* is an end view taken at line 5*b*—5*b* of Fig. 5;

Fig. 6 is a side view of the diode of Fig. 3, showing the insulating tube over one of its pigtails and the pigtail crimped around the end of the tube;

Fig. 7 is a side view of the diode having the insulating tube and a terminal cap mounted in accordance with this invention; and Fig. 8 shows a spring-clip type terminal mounting on which the diode is mounted.

Referring to Figs. 1 and 2 of the drawing there is illustrated a well-known form of diode 10, for example a crystal junction type. It comprises a metallic base plate 11, ordinarily circular as shown. Mounted on the base plate 11, as by soldering, is a metallic flange 12, formed on a cylindrical collar 13. The crystal junction can be mounted in a well-known manner on the base plate within the collar so that one terminal of the junction is the base plate itself including the metal collar 13 in contact with the base plate, and the other terminal of the junction is a conductive lead 14 in contact with the junction and extending axially through the collar as shown. The lead 14 is held in its central position out of contact with the base and collar 13 by a suitable insulating compound 15 which fills the space between the lead and the collar. The outer surface of the base 11 is provided with a centrally located boss 16 to which is fastened a terminal lead or pigtail 17 as by welding or crimping. Somewhat similarly, another pigtail 18 is fastened to the lead 14 by welding, and in accordance with a common practice, the outer end of the lead 14 is flattened at 19 which has the effect of giving it a width at the flattened portion somewhat greater than the diameter of the main part of the lead.

The exterior arrangement shown in Fig. 1 is a common form of diode. While the interior of the diode and the particular kind of crystal junction used in it are of no particular consequence in the present invention, details of a suitable junction arrangement are shown in Fig. 2*a*. In Fig. 2*a*, a wafer 8 of a crystal, for example silicon, is attached to the base plate as by solder at a central position within the collar 13 and a tube 9 of a metal such as aluminum is fused or welded to the silicon wafer as shown. With an N-type silicon wafer this will create a P–N junction in a well known manner. The lead 14 is inserted within the tube 9 where it may be soldered. The insulating compound 15 which may be a glass, is then placed in the space between the collar 13 and lead 14, and allowed to solidify. It will be understood that the junction itself may be made in any of a variety of forms and materials, and that the particular internal construction of the junction is not critical to the invention.

The diode arrangement of Fig. 1 is useful where it is desired to mount the diode by soldering its pigtail leads 17 and 18 to suitable fixed terminals. To do this, the pigtails 17 and 18 are cut to the appropriate length to fit the distance between the terminals. It is desirable, however, in many applications to mount such a diode in terminal clips such as fuse clips, instead of by soldering pigtail leads. While the cylindrical collar 13, at one terminal of the diode is suitable for mounting in a spring clip, it is apparent that neither the lead 14 nor its pigtail 18 is suitable for such spring clip mounting.

In accordance with the present invention, means is provided for adapting the diode arrangement of Fig. 1 to such spring clip mounting. This means comprises the steps and arrangements shown in Figs. 3 to 7. In Fig. 3, the pigtail 17 is shown cut off flush with the boss 16, since it will not now be needed. The other pigtail 18 is likewise shortened by cutting so that the length of elements 14 and 18 will now be only about a fraction of an inch longer than the length of a tubing 20 of insulating material. This tubing may be of nylon or other suitable plastic or insulating material of similar texture, which is pliable and compliant, and its central opening 21 is of the proper diameter so that it will fit over the elements 14 and 18. Preferably this fit is such as to bulge the tubing somewhat at 22 (Fig. 6), this bulge being caused by the enlargement 19 which will serve to hold the tubing in place.

After the tubing is brought up flush against the end of collar 13 and the insulating material 15, the outer end of pigtail 18 is bent around the outer end of the tubing and crimped against the outside of the tubing as shown in Fig. 6. A metallic cap 23, closed at one end 24 and having a hole or opening 25 into the other end, is then placed over the outer end of the tubing 20 and the crimped conductor 18, as shown in Fig. 7. The diameter of hole 25 is such as to create a tight snug fit which can be forced on by hand without bending up the tube and its internal conductor, but which will nevertheless leave the cap securely in place and in firm contact with conductor 18. The outer diameter of cap 23 is cylindrical and will ordinarily be of the same diameter as that of collar 13.

Fig. 8 shows a holder for the diode of Fig. 7, providing spring clips 26 and 27 mounted by suitable fasteners 28 and 29 on an insulating block 30. This spring clip arrangement is in the general form of ordinary fuse clips, and the clips 26 and 27 are formed in the general shape of U-shaped spring arms to receive the respective ends 13 and 23 of the diode as shown in dotted lines in Fig. 7.

While the fuse clips shown in Fig. 8 are of a very general form, it will be understood that a diode constructed according to this invention can be placed in any such clips as will accommodate the dimensions of the diode. There are many specific forms of fuse or terminal clips available, and the only limitations on use of diodes according to the present invention, with them, are those of physical dimensions.

It will be recognized that by my invention there is provided a simple yet effective terminal mounting arrangement for an electrical component. While the invention has been described in reference to a crystal junction diode to which it is especially applicable, it should be understood that other components, such as, for example, condenser devices could as well be installed in the mounting arrangement. The invention is not limited except in accordance with the scope of the appended claims.

We claim:

1. An electrical component assembly comprising an electric element having two terminals, an electrically conductive housing surrounding said element and having an outer cylindrical portion connected to one of said terminals, an electrically conducting lead connected to the other of said terminals and protruding from and insulated from the cylinder, an insulating tubing mounted over the lead, said lead having a portion crimped around the end of said tubing which is remote from the cylinder, and a cylindrical cap having a central hole mounted over said end of the tubing and in contact with the crimped lead.

2. Apparatus according to claim 1 in which the tubing is a compliant plastic.

3. Apparatus according to claim 1 in which the tubing is nylon.

4. An electrical component assembly comprising an electric element having two terminals, an electrically conductive housing surrounding said element and having an outer cylindrical portion connected to one of said terminals, an electrically conducting stem connected to the other of said terminals and protruding from an end of said cylinder, said stem having an enlarged portion of a greater width than the remainder of said stem, an electrical lead connected to said enlarged portion, a filling of insulating material within said cylinder between the stem and the interior of the cylinder, a tubing of compliant insulating material mounted over the stem and in abutment with said end of said cylinder, a length of said lead protruding from the end of said tubing remote from said cylinder and crimped around said remote end, and a cylindrical cap having a central opening in one end which is mounted snugly over said remote end of said tubing and over said crimped lead, the end of said cap remote from said cylinder being closed.

5. Apparatus according to claim 4 in which said electric element is a diode.

6. Apparatus according to claim 4 in which said electric element is a crystal junction diode.

7. The method of converting an electrical component assembly of the type having a cylindrical outer housing and a pair of terminal leads protruding from the housing in substantial coaxial alignment with each other wherein the first of said leads is electrically connected to the housing and the second of said leads is electrically insulated from the housing, said method comprising placing an insulating tubing over said second lead in abutment with said housing, and leaving a length of said second lead protruding from the end of said tubing remote from the housing, crimping said protruding end around said remote end of the tubing, and forcing a metallic cap over said remote end and the crimped end, whereby the component may be held in a spring-clip mounting.

8. The method according to claim 7 in which the first lead is cut off at the housing.

References Cited in the file of this patent

UNITED STATES PATENTS

| | | |
|---|---|---|
| 1,537,856 | Michels et al. | May 12, 1925 |
| 2,827,597 | Lidow | Mar. 18, 1958 |